(12) United States Patent
St. Romain

(10) Patent No.: US 7,207,615 B2
(45) Date of Patent: Apr. 24, 2007

(54) VEHICLE CARGO BED EXTENDER

(76) Inventor: Jackie St. Romain, 4691B Highway 13, Greenville, NC (US) 27834

( * ) Notice: Subject to any disclaimer, the term of this patent is extended or adjusted under 35 U.S.C. 154(b) by 0 days.

(21) Appl. No.: 11/273,887

(22) Filed: Nov. 15, 2005

(65) Prior Publication Data

US 2006/0232087 A1 Oct. 19, 2006

Related U.S. Application Data

(60) Provisional application No. 60/628,909, filed on Nov. 18, 2004.

(51) Int. Cl.
*B60R 9/06* (2006.01)

(52) U.S. Cl. ............... 296/26.09; 296/26.08; 296/37.6; 224/402; 224/405

(58) Field of Classification Search .. 296/26.01–26.03, 296/26.08, 37.6, 37.16, 26.09, 26.1, 26.11; 224/405, 402, 281, 488, 523, 524, 528, 530, 224/526

See application file for complete search history.

(56) References Cited

U.S. PATENT DOCUMENTS

| | | | |
|---|---|---|---|
| 3,650,443 A | 3/1972 | Haskett et al. | |
| 4,813,584 A | 3/1989 | Wiley | |
| 4,906,015 A * | 3/1990 | LaCroix et al. | ........... 280/415.1 |
| 5,368,209 A | 11/1994 | Hill | |
| 5,451,088 A | 9/1995 | Broad | |
| 5,458,389 A | 10/1995 | Young | |
| 5,658,033 A | 8/1997 | Delaune | |
| 5,678,743 A | 10/1997 | Johnson et al. | |
| 5,752,636 A | 5/1998 | Manley | |
| 5,938,092 A | 8/1999 | Johnson | |
| 6,070,926 A | 6/2000 | Hardin | |
| 6,095,387 A * | 8/2000 | Lipscomb | ................... 224/485 |
| 6,099,061 A * | 8/2000 | Gessay | ................... 296/26.08 |
| 6,113,171 A | 9/2000 | Stearns | |
| D441,340 S | 5/2001 | Whiteford et al. | |
| 6,533,337 B1 * | 3/2003 | Harshman et al. | ....... 296/26.08 |
| 6,648,391 B1 * | 11/2003 | Whiteford et al. | ....... 296/26.08 |
| 6,834,902 B2 * | 12/2004 | Agan | ..................... 296/26.08 |

OTHER PUBLICATIONS

Stylinconcepts Catalog, p. 56, Hard-Top Tonneau Cover, on or before Jul. 17, 2004.*

* cited by examiner

*Primary Examiner*—D. Glenn Dayoan
*Assistant Examiner*—Greg Blankenship
(74) *Attorney, Agent, or Firm*—MacCord Mason PLLC

(57) ABSTRACT

A vehicle cargo bed extension device useable to increase the load bearing capacity of a vehicle cargo bed. The vehicle cargo bed extension device includes a rectangular deck attachable to a rectangular open deck frame having a rear beam and a front beam attached by side beams. A support frame having a horizontal attachment post for attaching the support frame to a trailer hitch supports the deck frame. A rear vertical post extends downwardly from the center rear of the deck frame to the rearward section of the horizontal attachment post. A front vertical post extends downwardly from the center of the deck frame front beam to a forward section of the horizontal attachment post, and outwardly inclined side bracing beams extend from the sides of the support beam to the side edges of the deck frame.

10 Claims, 3 Drawing Sheets

VEHICLE CARGO BED EXTENDER

This application claims the benefit of the filing date of Provisional Application No. 60/628,909, filed Nov. 18, 2004.

BACKGROUND OF THE INVENTION (1) Field of the Invention

The present invention relates generally to a cargo bed extension device for vehicles, and in particular to an extension device that is attachable at the rear of a vehicle-towing receiver.

(2) Description of the Prior Art

The prior art describes numerous cargo bed extension devices for vehicles such as pick-up trucks. Generally, these devices are supported at the rear of a lowered tailgate, using a support mechanism that is mounted on a hitch retainer. Normally, the extension device is comprised of a rectangular deck having a width substantially equal to the width of the vehicle cargo bed or at least a vehicle's inner fender area, and a deck support to hold the deck in the desired position, when a horizontal hitch attachment post is inserted into the hitch retainer.

Prior art vehicle cargo bed extension devices are not entirely satisfactory, however, in that they tend to wobble, are not of sufficient strength to support heavier loads, and are complex in their construction. Thus, there is a need for a vehicle cargo bed extension device that is simple to manufacture, light weight yet capable of supporting heavy loads, and stable when under a load.

SUMMARY OF THE INVENTION

The present invention achieves these objectives by providing a vehicle cargo bed extension device that is comprised of a rectangular deck, and a support frame of minimal parts constructed in such a way as to provide rigid support to the deck. The support frame further includes a retainer post for attachment to a hitch retainer. For the purposes of this disclosure, examples of vehicles that can benefit from the present invention include but is not limited to, pick-up trucks, sport utility vehicles, cargo trailers, and three, four and six-wheel all-terrain vehicles such as John Deere Corp's. Gator™ utility vehicle.

In particular, the vehicle cargo bed extender of the present invention is comprised of a rectangular deck comprised of a rectangular open frame covered by a surfacing material. Preferably, the deck frame is constructed of metal, e.g., aluminum or steel, front, back and side square tubing sections welded to each other at their ends to form the frame. The frame will normally be from about 3 to 5 feet in length, i.e., front to back, with a width substantially equal to, or slightly less than, the width of the bed of the pickup vehicle cargo to which it is to be attached.

The deck is attached to the upper surface of the deck frame, e.g., by welding, bolting or other suitable means. Preferably, the deck is a metal mesh or a metal sheet, such as diamond plate aluminum. However, it will be apparent to one skilled in the art that other decking materials, such as engineering plastic, wood, etc., can be used, provided that the deck is of sufficient strength to support anticipated loads.

The deck and deck frame are carried on a support frame that will support loads of the anticipated weight and provide rigidity and stability to the deck, while still being light weight and simple to construct. Essentially, the support frame is comprised of a horizontal attachment post sized for insertion into a trailer hitch, a front vertical post extending downwardly from the deck frame front beam at a point centrally located between the ends of the front beam to a forward section of the horizontal attachment post, a rear vertical post extending downwardly from the deck frame rear beam at a point centrally located between the ends of the rear beam to a rearward section of the horizontal attachment post and outwardly inclined side bracing beams extending from the sides of the horizontal attachment post to the side edges of the deck frame. Preferably, all of the beams are welded to each other and to the deck frame to provide a rigid, integral structure.

The extension device may also include additional features. For example, the device may include signal lights such as turn indicator lights, and brake lights on the rear of the extension device, that are connectable, e.g., through the frame tubing, to the vehicle cargo electrical system, so that the lights can be readily seen when the device is mounted for use. Side rails attachable to the deck frame may also be included.

When the device is to be used, the horizontal attachment post is inserted into the hitch receiver, with a locking pin being inserted through matching holes in the receiver and post. The tailgate of the vehicle cargo is then lowered to a position co-planer with the pickup vehicle cargo bed. When mounted, the front edge of the deck is substantially level with the rear edge of the pickup vehicle cargo tailgate. Moreover, when in use, the front of the deck frame has a front edge that rests adjacent to the rear edge of the pickup vehicle cargo tailgate. As a result of the unique construction of the support frame, a high load-bearing, stable platform is provided at the rear of the existing vehicle cargo bed, enabling the carrying of material that extends beyond the existing vehicle cargo bed.

DETAILED DESCRIPTION OF THE INVENTION

Figure 1:
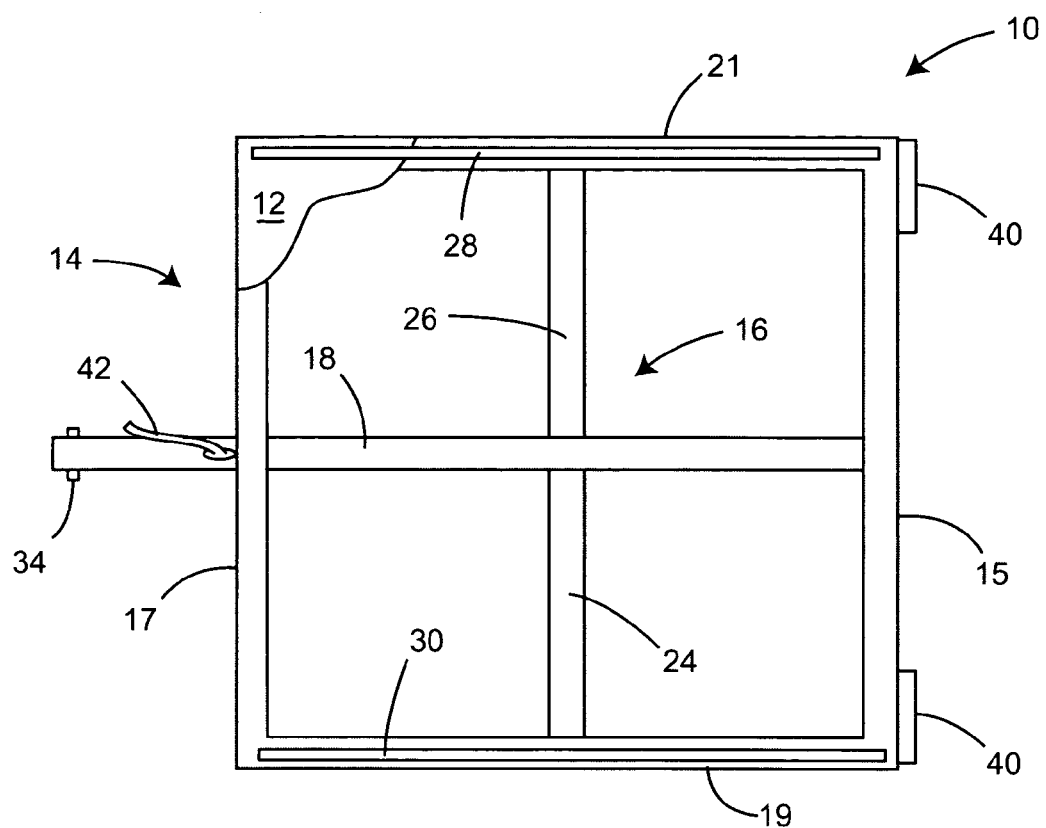
FIG. 1 is a top view of the vehicle cargo bed extender.
Figure 2:
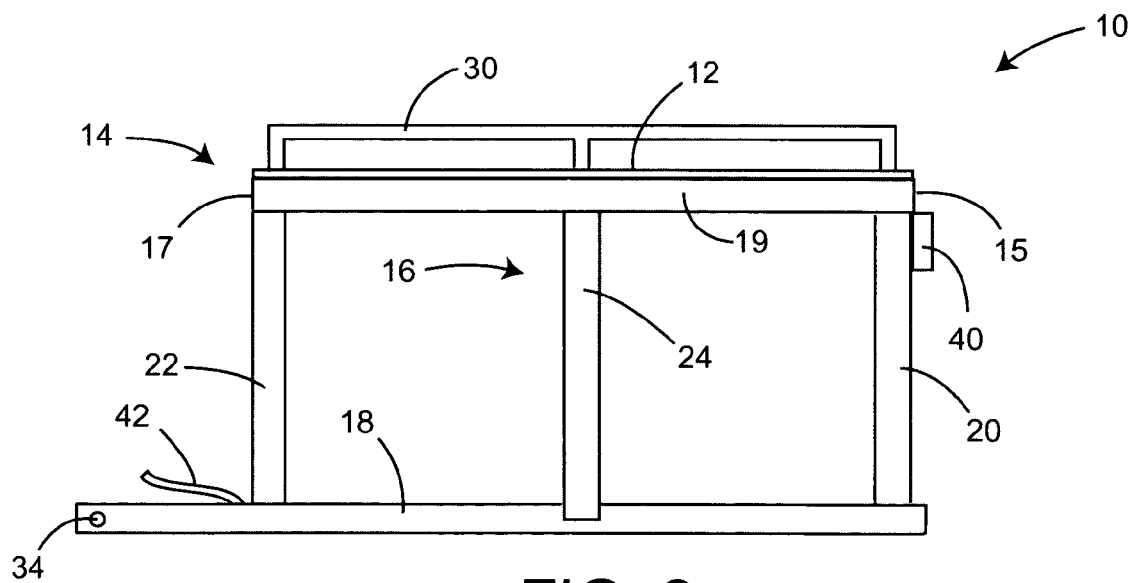
FIG. 2 is a side view of the vehicle cargo bed extender.
Figure 3:
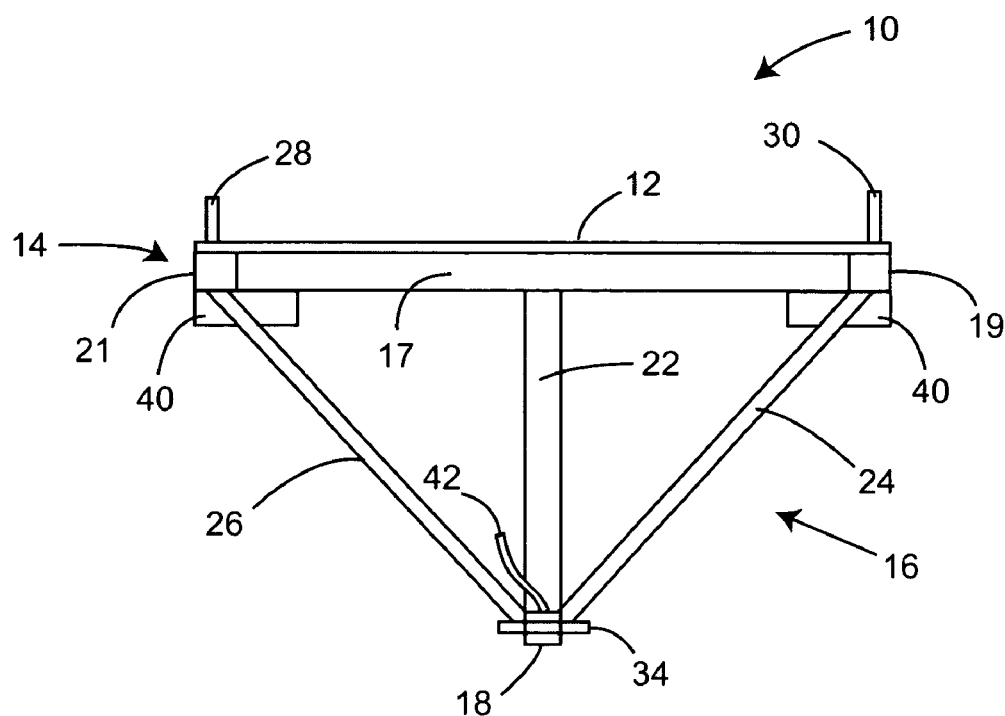
FIG. 3 is a front view of the vehicle cargo bed extender.
Figure 4:
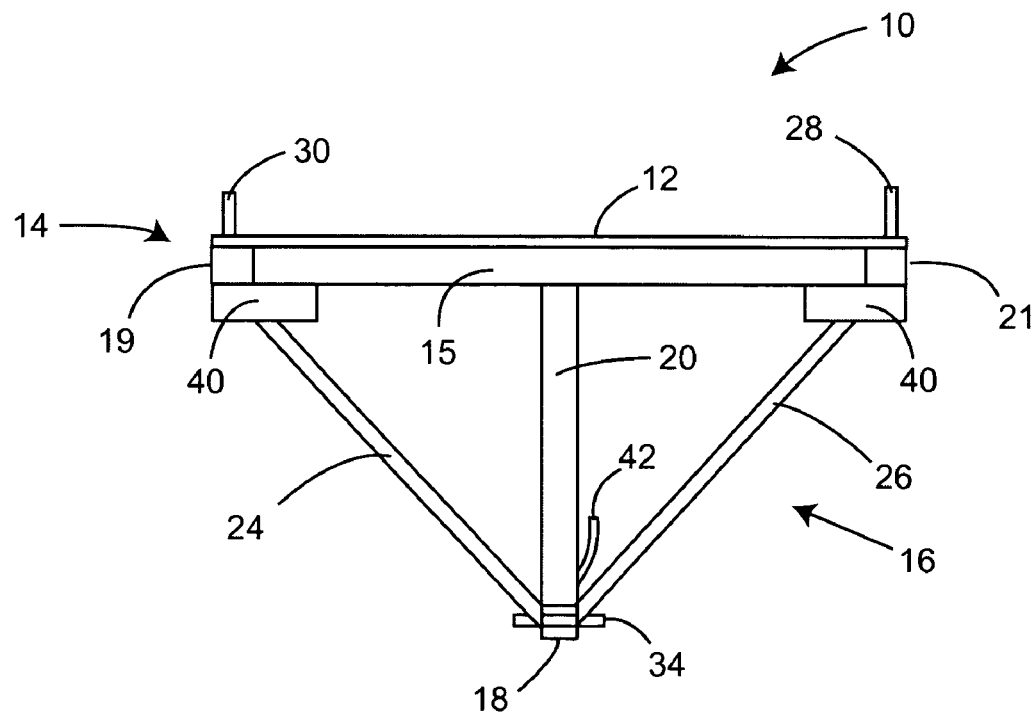
FIG. 4 is a rear view of the vehicle cargo bed extender.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

As shown in FIGS. 1–5, the vehicle cargo bed extender of the present invention, generally 10, is comprised of a rectangular deck 12 shown partially cut away for purposes of illustration, a deck frame, generally 14, and a support frame, generally 16. Deck frame 14 is comprised of integrally welded front 17, rear 15 and first and second side beams 19 and 21, wherein each beam is of rectangular tubing construction.

Support frame 16 is comprised of a horizontal attachment post 18 sized for insertion into a trailer hitch, a rear vertical post 20 extending downwardly from deck frame rear beam 15 at a point centrally located between the ends of rear beam 15 to a rearward section of horizontal attachment post 18, a front vertical post 22 extending downwardly from deck frame front beam 17 at a point centrally located between the ends of front beam 17 to a forward section of horizontal attachment post 18, and outwardly inclined side bracing beams 24 and 26 extending from horizontal attachment post 18 to the deck frame side beams 19 and 21, respectively.

As best seen in FIGS. 2–5, a pair of side rails 28 and 30 are attachable to deck frame 14. Moreover, signal lights 40 are attachable to the rear of deck 14. Electrical wiring 42 for signal lights 40 is preferably enclosed within beams 15 and 20 and attachment post 18, which serve as conduits for wiring 42. Openings are machined into post 18 and beam 15 so that wiring 42 can be passed into and out of post 18 and beam 15 at desirable locations.

Figure 5:
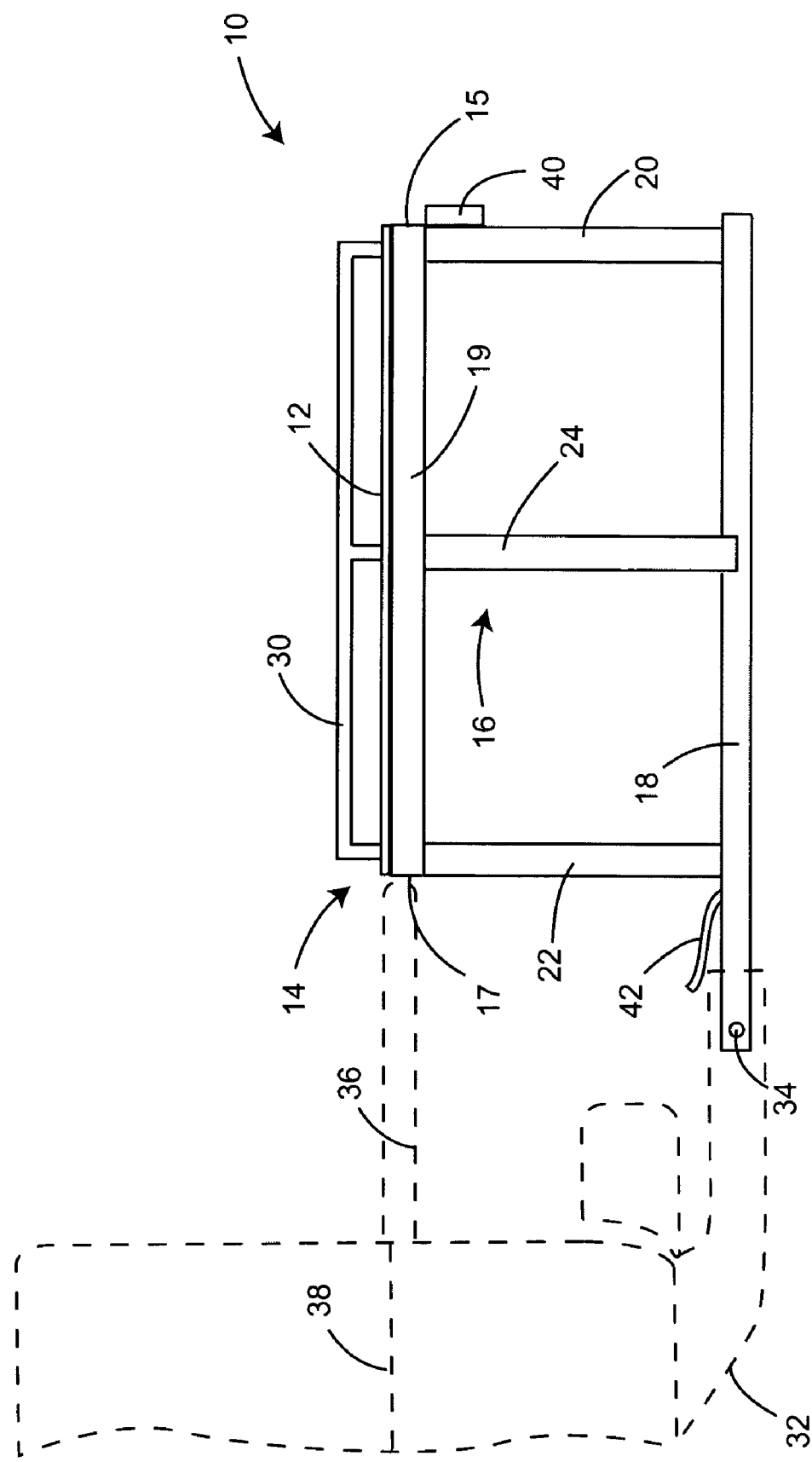
FIG. 5 is a side view of the vehicle cargo bed extender hitched to a cargo vehicle.

FIG. 5 depicts extension device 10 hitched to the rear of a cargo vehicle shown in dashed lines. When extension device 10 is to be used, the horizontal attachment post 18 is inserted into a hitch receiver 32, with a locking pin 34 being inserted through matching holes in receiver 32 and post 18. A tailgate 36 of the vehicle cargo is then lowered to a position co-planer with the pickup vehicle cargo bed 38. When mounted, deck 12 is substantially level with the rear edge of tailgate 36. Moreover, when in use, the front of the deck frame 14 has a front edge that rests adjacent to the rear edge of the vehicle cargo tailgate 36.

Certain modifications and improvements will occur to those skilled in the art upon a reading of the foregoing description. It should be understood that all such modifications and improvements are properly within the scope of the following claims.

What is claimed is:

1. A vehicle cargo bed extension device for increasing the load capacity of a vehicle cargo bed, said vehicle cargo bed extension device comprising:
   a) a deck attachable to a rectangular open deck frame having a rear beam and a front beam attached by side beams, said deck frame being supported by a support frame having a horizontal attachment post for attaching said support frame to a trailer hitch;
   b) a front vertical post extending downwardly from the deck frame front beam at a point centrally located between the ends of the front beam to a forward section of the horizontal attachment post;
   c) a rear vertical post extending downwardly from the center of the deck frame rear beam at a point centrally located between the ends of the rear beam to a rearward section of the horizontal attachment point;
   d) a first outwardly inclined side bracing beam extending from said attachment post to one of said side beams and a second outwardly inclined side bracing beam extending from said attachment post to the other of said side beams;
   e) signal lights attachable to the rear of said deck frame; and
   f) electrical wiring positioned within said attachment post for communicating electrical signals from a cargo vehicle to said signal lights.

2. The vehicle cargo extension device of claim 1, wherein said rear, front and side beams are constructed from metal tubing sections welded to each other at their ends to form said rectangular open deck frame.

3. The vehicle cargo extension device of claim 1, wherein said rectangular deck has a metal sheet covering.

4. The vehicle cargo extension device of claim 3, wherein said metal sheet covering is aluminum diamond plate.

5. The vehicle cargo extension device of claim 1, wherein said rectangular deck has a metal mesh covering.

6. The vehicle cargo extension device of claim 1, further including a locking pin for securing said extension device to the hitch of a cargo vehicle.

7. The vehicle cargo extension device of claim 1, wherein said deck is substantially level with the rear edge of a cargo vehicle's tailgate having a lowered position when said extension device is hitched to said cargo vehicle and said vehicle tailgate is in its lowered position.

8. The vehicle cargo extension device of claim 7, wherein said deck frame has a front edge that rests adjacent to the rear edge of the pickup vehicle cargo tailgate when said cargo vehicle's tailgate is in its lowered position.

9. The vehicle cargo extension device of claim 1, further having a width substantially equal to, or slightly less than, the width of the bed of the cargo vehicle to which it is to be attached.

10. The vehicle cargo extension device of claim 1, frame is from about three to five feet in length between said front and rear beams.

* * * * *